US010112275B2

(12) United States Patent
Dupouy et al.

(10) Patent No.: US 10,112,275 B2
(45) Date of Patent: Oct. 30, 2018

(54) MOUNTING FOR LOCKING A VANE BY MEANS OF THE BLADE THEREOF DURING MACHINING OF THE ROOT OF SAID VANE (75) Inventors: Olivier Dupouy, Levallois-Perret (FR); Jose Chacon, Villeneuve la Garenne (FR); Philippe Desmars, Meulan (FR); Gerard Heyer, Antony (FR); Jean-Paul Menguy, Bezons (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 903 days.

(21) Appl. No.: 13/582,205

(22) PCT Filed: Feb. 28, 2011

(86) PCT No.: PCT/FR2011/050402
§ 371 (c)(1),
(2), (4) Date: Oct. 4, 2012

(87) PCT Pub. No.: WO2011/107699
PCT Pub. Date: Sep. 9, 2011

(65) Prior Publication Data
US 2013/0015618 A1   Jan. 17, 2013

(30) Foreign Application Priority Data
Mar. 5, 2010 (FR) ...................... 10 51616

(51) Int. Cl.
B25B 1/02 (2006.01)
B25B 1/24 (2006.01)
(Continued)

(52) U.S. Cl.
CPC ................ *B23Q 3/063* (2013.01); *B25B 5/14* (2013.01)

(58) Field of Classification Search
CPC ... B23H 9/10; B23P 5/00; F01D 5/005; B25B 1/02; B25B 1/06; B25B 1/10;
(Continued)

(56) References Cited

U.S. PATENT DOCUMENTS 2,565,925 A * 8/1951 Lombard ................ F01D 5/147
269/152
2,907,233 A * 10/1959 Broffitt .................... B23B 49/04
269/106
(Continued)

FOREIGN PATENT DOCUMENTS

EP   2 002 926   12/2008
EP   2 145 734   1/2010
GB   2458738 A * 10/2009 ............. B23Q 3/063

OTHER PUBLICATIONS

International Search Report dated Jun. 20, 2011 in PCT/FR11/50402 Filed Feb. 28, 2011.

Primary Examiner — Joseph J Hail
Assistant Examiner — Jon Taylor
(74) Attorney, Agent, or Firm — Oblon, McClelland, Maier & Neustadt, L.L.P.

(57) ABSTRACT

A mounting for locking a turbine engine vane that includes a blade and at least one portion outside the blade is provided. The mounting can machine the outside portion on a machine tool and includes a stationary jaw for receiving the vane, the jaw including at least six points that form abutments and define a positioning reference system for the vane. The mounting also includes a movable jaw to ensure, during machining the outside portion, holding the vane against the stationary jaw by a clamping mechanism onto the vane blade. The movable jaw includes a first clamping mechanism exerting pressure on one of the surfaces of the blade, the pressure being substantially perpendicular to the surface. The stationary jaw includes a second clamping mechanism
(Continued)

exerting pressure on the leading or trailing edge of the blade, the pressure being substantially oriented in the direction of the trailing or leading edge of the blade.

13 Claims, 3 Drawing Sheets

(51) Int. Cl.
*B23Q 3/06* (2006.01)
*B25B 5/14* (2006.01)

(58) Field of Classification Search
CPC .. B25B 1/103; B25B 1/20; B25B 1/24; B25B 1/2405; B25B 1/2415; B25B 1/2421; B25B 1/2452; B25B 1/2457; B25B 1/2478; B25B 1/2484
USPC ........... 269/1, 2, 9, 10, 37–45, 89, 104, 246, 269/289 R, 900; 100/214–294; 29/281.1, 29/281.4, 281.6, 283, 56.5, 56.6, 889.1, 29/889.2, 889.7

See application file for complete search history.

(56) References Cited

U.S. PATENT DOCUMENTS

| | | | | |
|---|---|---|---|---|
| 3,818,646 A | * | 6/1974 | Peterson | B23Q 3/063 269/106 |
| 3,981,786 A | * | 9/1976 | Andrews | 204/224 M |
| 4,033,569 A | * | 7/1977 | Dunn | B23Q 3/062 269/106 |
| 4,805,351 A | * | 2/1989 | Dobson et al. | 451/28 |
| 4,836,518 A | * | 6/1989 | Janutta | 269/43 |
| 5,813,593 A | | 9/1998 | Galaske, Jr. | |
| 6,000,681 A | * | 12/1999 | Hussaini | 254/101 |
| 6,844,515 B2 | * | 1/2005 | Byrnes et al. | 219/69.11 |
| 6,890,248 B2 | * | 5/2005 | Whitmarsh et al. | 451/365 |
| 2009/0278294 A1 | * | 11/2009 | Wang et al. | 269/9 |

* cited by examiner

MOUNTING FOR LOCKING A VANE BY MEANS OF THE BLADE THEREOF DURING MACHINING OF THE ROOT OF SAID VANE

BACKGROUND OF THE INVENTION

Field of the Invention

The present invention relates to the aeronautical sector and more particularly to the sector for the manufacture of vanes for turbine engines.

Description of the Related Art

The vanes of turbine engines consist of two parts, a top part, or blade, and a bottom part, or root, the two being separated by means of a platform. The blade is intended to be positioned inside the gas stream so as to produce compression of the gases, in the case of compressor vanes, or produce work by means of expansion of the stream gases, in the case of the turbine vanes. An essential element in the manufacture of a vane is the correct relative orientation of the blade in relation to the root since, as the root is attached to a disk and therefore fixed in relation to the turbine engine, this orientation determines the position of the blade in the gas flow and consequently its aerodynamic efficiency.

The manufacture of a vane commences, generally, with the formation of a blank, either by means of forging in the case of a compressor vane, or by means of casting in the case of a turbine vane. This operation usually results in a part with finished dimensions as regards the blade and only a rough-formed part as regards the root, which must then be cut in order to provide it with its final bulb or fir-tree shaped form. The shape imparted to the root allows it to be held by a socket in the disk during its operation on the turbine engine. It is important during this root cutting operation not to increase the imprecision in positioning of the blade relative to the root, by avoiding the addition of excessively large machining tolerances to the already existing tolerances, associated with manufacture of the blade.

Machining of the root is performed by positioning the vane in a known reference system, associated with the machine tool, and formed by six bearing points forming stops against which the vane must bear. The points of the vane in contact with these stops are in some cases formed by a reference point on the outer surface of the vane, which is generated during forging or casting. The following step, which is the essential step for ensuring correct positioning of the root relative to the blade, consists in clamping the vane so that it does not move during machining of the root and so that therefore the flanks of the bulb or fir-tree are correctly oriented. One of the difficulties associated with this operation consists in the three-dimensional form of the blade which does not have a flat surface onto which a perfectly distributed bearing pressure may be applied.

One of the methods commonly used in the prior art consists in coating the blade, or at least a substantial part thereof, in a core made of a material with a low melting point. In this way the question of precise positioning of the blade depends on the positioning of the core which has, by way of design, flat surfaces. After performing machining of the root, the core is eliminated by means of melting and the vane again assumes its normal outer form. This method involves several drawbacks such as that of increasing the risk of imprecise positioning of the root, adding to the manufacturing tolerances of the blade those arising from positioning of the core around it; it is also advisable to protect the cavities formed in the blade, in the particular case of turbine vanes, in order to prevent the material of the core, following liquefaction thereof, blocking the orifices for access to the vane cooling cavities; finally, even if the core material is carefully chosen, there exists the risk that the surfaces of the blade may be contaminated by this material.

Another method has been devised, consisting in mechanically clamping the blade, following installation thereof and the platform of the vane, against the six stops of the machining head of the machine tool, resting a clamping piece against it. This method does not ensure a perfect stability because the bearing pressure, which is generally applied to the center of the outer side of the blade, is thus limited because it acts only in one direction. The amount of pressure which can be applied is moreover limited by the strength of the blade and by that of the lining forming the thickness of this outer side. In the event of an insufficient bearing pressure the blade may move during machining; on the other hand, too great a bearing pressure would result in scoring of the surface of the outer side together with, in some cases, deformation of the profile of this outer side which has a relatively small thickness.

BRIEF SUMMARY OF THE INVENTION

The object of the present invention is to overcome these drawbacks by proposing a device for holding the blade of a vane of a turbine engine on the machining head of a machine tool, which does not have at least some of the drawbacks of the prior art and, in particular, which ensures firm retention of the blade during cutting of the root or some other part of the vane, without the risk of damaging the profile.

For this purpose, the present invention relates to a mounting for locking in a machine tool, a workpiece comprising a first part with a three-dimensional form having a non-planar surface delimited by at least two substantially parallel side edges and at least a second part adjacent to the said first part, for machining of the said second part, the said mounting comprising a stationary jaw, which is intended to receive the said workpiece and has, defined thereon, at least six points forming stops and defining a positioning reference system for the said workpiece on the said stationary jaw, and a movable jaw intended to ensure, during machining of the said second part, retention of the said workpiece against the said stationary jaw by the action of at least one means for performing clamping on the first part, the movable jaw having a first clamping means exerting a pressure substantially perpendicular to the said surface, on the said non-planar surface of the first part, characterized in that the stationary jaw has a second clamping means exerting a pressure on one of the side edges which is oriented substantially in the direction of the other side edge.

The presence of a second clamping means acting in the direction linking together the two side edges, together with a first clamping means acting on the non-planar surface of the workpiece, ensures excellent retention of the workpiece, even when the machining grinder acts on the second part in a direction parallel to that of the force exerted by the second clamping means.

In a particular embodiment the workpiece to be locked is a vane of a turbine engine, the first part being the blade and the side edges being the leading edge and trailing edge of the said turbine engine vane. It is thus possible to correctly machine a vane root while retaining the latter solely by means of the pressures exerted on the blade, thereby freeing access to the root.

Advantageously, the first clamping means comprises at least three bearing points distributed discretely on the said non-planar surface.

The choice of contact along discrete surfaces results in better adaptation of the bearing points on the surface of the blade, despite the manufacturing variations, and the choice of multiple bearing points results in a reduction in the pressure applied at each point on the vane. This characteristic feature is important in that the turbine vanes are hollow and their outer surfaces are made in the form of relatively thin linings.

In a particular embodiment the first clamping means comprise at least four bearing points distributed discretely over the said non-planar surface so that the pressure exerted on the said surface is, at all points, less than 100 bar.

Preferably, the resultant of the forces acting on the said non-planar surface acts inside the polygon linking together the stops associated with the said surface. A positive bearing pressure is thus obtained on each of the stops associated with the inner side of the vane.

Even more preferably, the resultant of the forces acting on the said non-planar surface acts substantially in the region of the center of gravity of the stops associated with the said surface, each of the stops being acted on by the same coefficient. Each stop is thus subjected to the same pressure, which is the minimum value necessary for retaining the vane.

In a particular embodiment, the second clamping means comprises at least two bearing points distributed discretely along the said one of the side edges.

Advantageously, the resultant of the forces acting on the said one of the side edges acts inside the segment linking together the stops associated with the said other side edge.

Preferably, the resultant of the forces acting on the said one of the side edges acts substantially in the region of the center of gravity of the stops associated with the other side edge, each of the stops being acted on by the same coefficient.

In a particular embodiment, the second clamping means has the form of a base block with protrusions and is actuated by a single clamping means.

The invention also relates to a locking mounting such as that described above, equipped with a workpiece retained against its stationary jaw by its movable jaw.

BRIEF DESCRIPTION OF THE SEVERAL VIEWS OF THE DRAWINGS

The invention will be understood, and other aims, details, characteristic features and advantages thereof, will emerge more clearly during the course of the detailed description which follows of several embodiments of the invention provided by way of purely illustrative and non-limiting examples, with reference to the accompanying schematic drawings.

In these drawings.

DETAILED DESCRIPTION OF THE INVENTION

Figure 1:
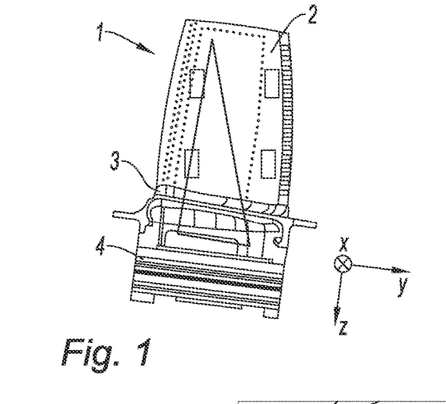
FIG. 1 is a front view, from the inner side, of the vane of a high pressure (HP) turbine of a turbine engine.
Figure 2:
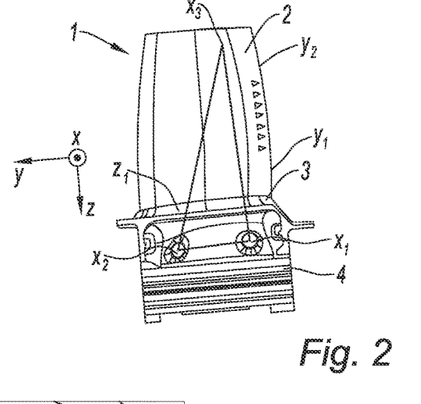
FIG. 2 is a front view, from the outer side, of the same vane of a high pressure (HP) turbine of a turbine engine.

With reference to FIGS. 1 and 2, these show the inner side and outer side of an HP turbine vane 1 comprising a blade 2 terminating at the bottom in a platform 3 which delimits a vane root 4. The said root is still in the form of a blank and must be machined in order to give it a bulb or fir-tree shaped form. The vane 1 is configured spatially in relation to an orthonormal reference system x, y, z, the x direction being oriented perpendicularly with respect to the center plane of the blade 2, the y direction being in this plane and oriented parallel to the plane of the platform 3, and the z direction being oriented perpendicularly with respect to the platform 3.

FIG. 2 shows three points of the outer side, indicated by X1, X2 and X3, which define the points via which the vane must bear against three of the six points of the reference system for positioning the vane in the machining head 5 of the machine tool. The three corresponding points are the points which act as bearing points for the vane against the points X'1, X'2 and X'3 of the positioning reference system forming stops along the x direction. The precise positioning of the vane 1 against the machining head 5 is thus ensured by means of these three stops which lock it in the x direction and which cooperate with the points X1, X2 and X3 of the outer side, by means of two stops for locking points Y1 and Y2 in the y direction which are intended to receive the leading edge of the vane and by a stop for locking the vane 1 in the z direction in the region of a point Z1 positioned on or underneath the platform 3.

Figure 3:
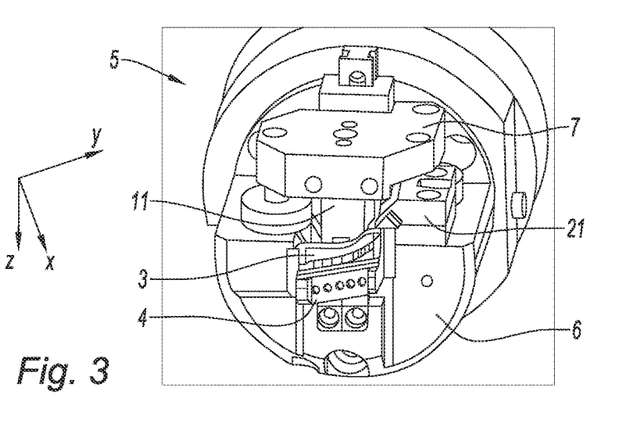
FIG. 3 is a perspective view of a vane of an HP turbine installed in a machining head of a machine tool and held in position by a retaining device according to an embodiment of the invention.

With reference now to FIG. 3, this shows a machining head 5 having a stationary jaw 6 and a movable jaw 7 which are intended to keep, by gripping of its blade, a vane 1 in position during machining of its root. This head 5 is intended to be arranged opposite a grinder which has on its cutting edge the profile, in reverse, which is to be imparted to the root 4. The vane 1 projects from the machining head 5 via its platform 3 and its root 4, while the blade 2, not visible in the figure, is gripped between the jaws 6 and 7 of the head 5.

Figure 4:
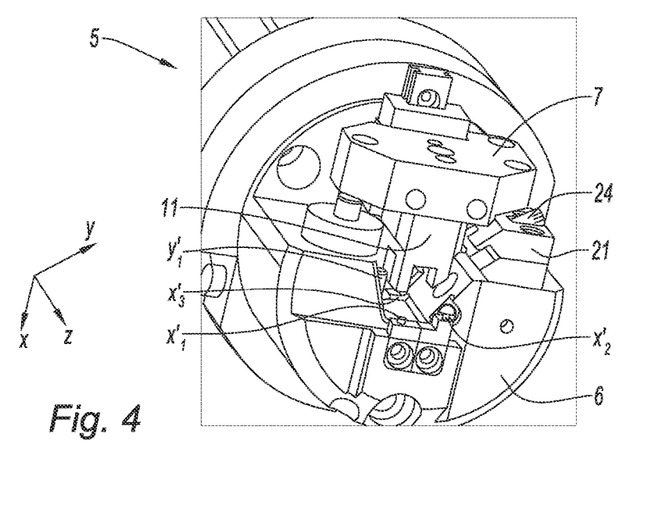
FIG. 4 is a perspective view of the machining head of a machine tool and its retaining device according to an embodiment of the invention.

FIG. 4 shows the same machining head 5, without the vane 1 between its jaws. It is possible to see the stops X'1, X'2 and X'3 against which the reference points X1, X2 and X3 of the outer side of the vane will bear during positioning in the machining head 5. It is also possible to see one of the side stops Y'1 against which a point Y1 (formerly shown in FIG. 2) of the leading edge of the vane 1 bears. FIGS. 3 and 4 also show two clamping means 11 and 21 which have the function of keeping the vane 1 in contact against the said stops during machining of the root 4. A first vertical clamp 11 has the function of bearing against the inner side of the vane 1 in order to ensure that its outer side is kept against the stops X', X'2 and X'3 in the region of the bearing points X1, X2 and X3. A second lateral clamp 21, for its part, ensures pressure against the trailing edge of the vane 1, oriented in the direction of the leading edge, so that the latter remains in contact with the stops in the y direction in the region of its bearing points Y1 and Y2 (only the stop Y'1 is shown associated to the bearing point Y1 formerly shown in FIG. 2 is shown in FIG. 4).

Figure 5:
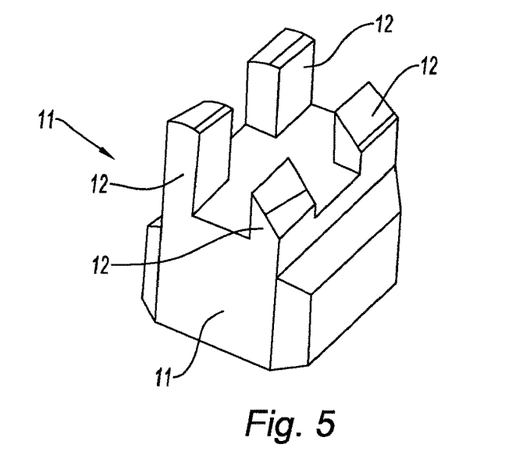
FIG. 5 is a perspective view of a first means for retaining a vane forming part of a retaining device according to an embodiment of the invention.
Figure 6:
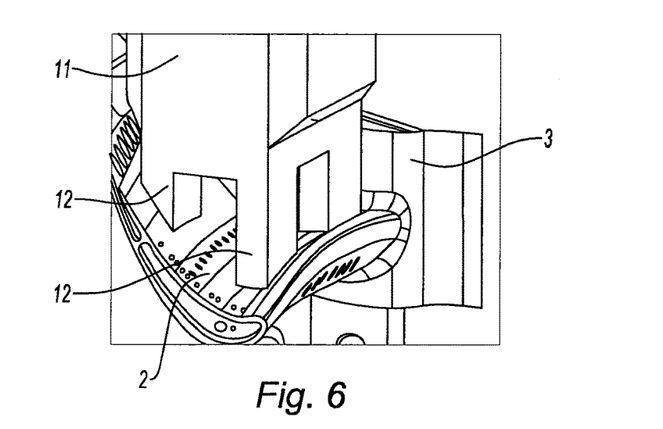
FIG. 6 is a perspective view of the said first retaining means, in position against the inner side of an HP turbine vane.

The form of the vertical clamp 11 is shown in detail in FIGS. 5 and 6. The clamp has substantially the form of a rectangular parallelepiped from which four contact lugs 12 extend in the four corners of one of its sides. These contact lugs are parallel to each other, in a direction which corresponds to the vertical direction, once the vertical clamp 11 has been installed on the tooling head 5. They terminate in curved surfaces which reproduce, in reverse, the form of the inner side at the location where they have the bearing function. FIG. 1 shows the form of the surfaces of the inner side of the vane 1 against which these four contact lugs exert their bearing force.

Figure 7:
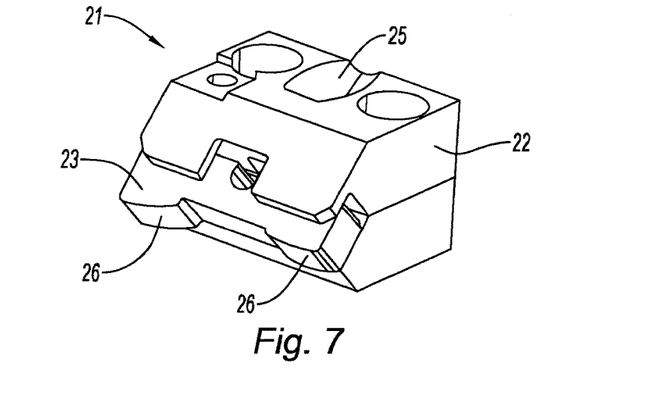
FIG. 7 is a perspective view of a second means for retaining a vane forming part of a retaining device according to an embodiment of the invention.
Figure 8:
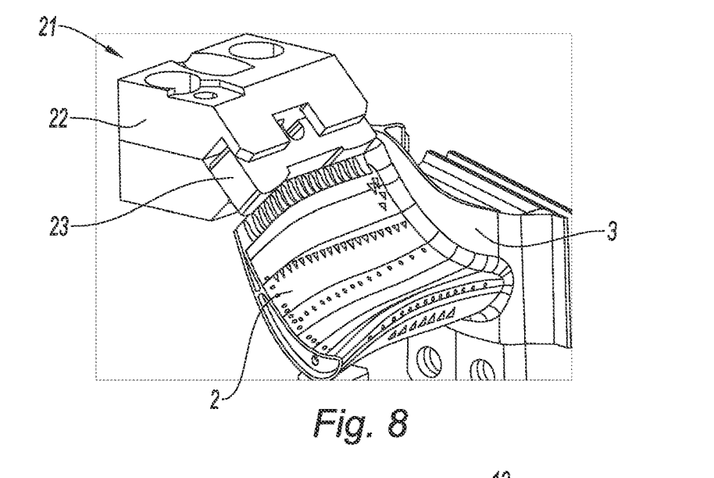
FIG. 8 is a perspective view of the said second retaining means, in position against the trailing edge of an HP turbine vane.

Similarly FIGS. 7 and 8 show the form of the lateral clamp 21. These show a lateral clamp formed by two parts: a stationary part 22 mounted on the stationary jaw 6 of the machining head 5 and a movable part 23 in the form of a base block which is able to move away from or towards the stationary part 22 by means of the action of a locking screw 24, visible in FIG. 4. The locking screw 24 moves inside a cylindrical seat 25, the axis of which is oriented towards the position which the leading edge of the vane 1 will have once the vane has been mounted on the tooling head 5. The base block 23 has two convex protrusions 26 which have the function of providing bearing support for the lateral clamp 21 against the trailing edge of the vane 1. These protrusions have on their outer surface the form, in reverse, of the trailing edge in the region of their point of contact with this trailing edge. Operation of the locking screw 24 imparts a pressure on the trailing edge of the vane 1 and ensures direct contact of the leading edge of the vane, in the region of its points Y1 and Y2 formerly shown in FIG. 2, against the stops in the y direction (only Y'1 has been shown in FIG. 4).

Figure 9:
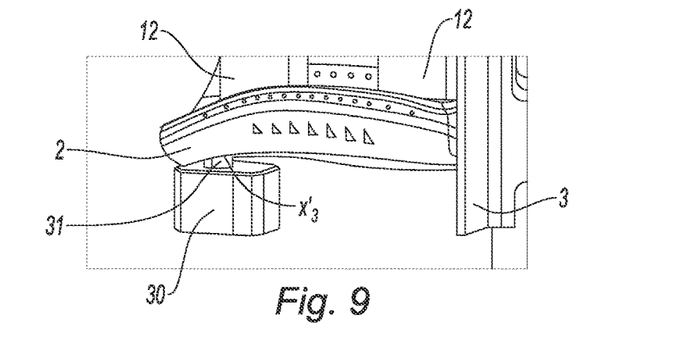
FIG. 9 is a perspective view of an HP turbine vane, its outer side bearing against a stop belonging to the vane positioning reference system.

FIG. 9 shows the positioning of the vane 1 in the z direction. The vane is pushed downwards by the pressure exerted on its inner side by the contact lugs 12 of the vertical clamp 11 and held in position on the one hand by the stops X'1 and X'2, not visible in the figure, and by the outer-side stop X'3. The latter stop is shown in the form of a part 30 which is substantially cylindrical in relation to generatrices in the z direction and has, extending therefrom, a bottom contact lug 31, the outer surface of which reproduces, in reverse, the form of the surface of the outer side with which it comes into contact.

Figure 10:
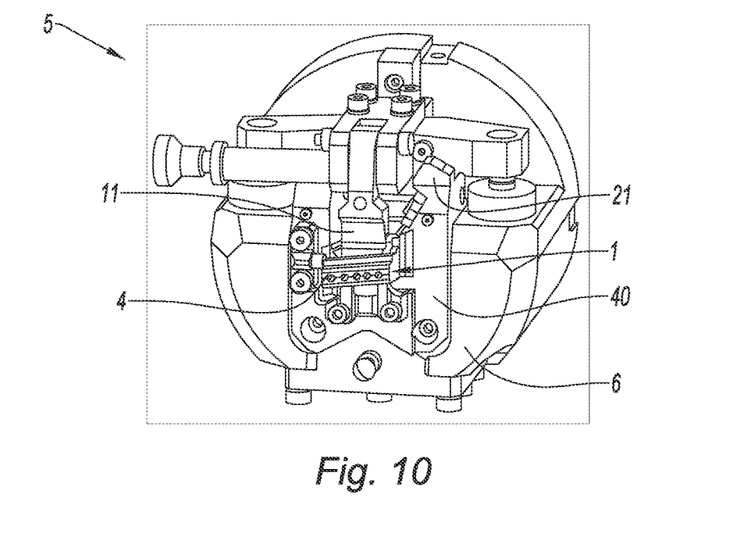
FIG. 10 is a perspective view of a vane of an HP turbine installed in a machining head of a machine tool and held in position by a retaining device according to an alternative embodiment of the invention.

Finally, FIG. 10 shows a shuttle tool 40 which has several stops and clamps 11 and 21 and which receives, inserted inside it, a vane 1 in the same manner as described above. The shuttle tool 40 is itself fixed inside the stationary jaw 6 of the machining head 5 by means of methods known to the person skilled in the art. The dimensions and the positioning of the stops in this shuttle tool are such that, by configuring the latter for a given type of vane to be machined, it is possible to use the same adjustments of the same machining head for several types of vane.

The change-over from one vane of a certain type to a vane of another type is performed by changing the shuttle tool and choosing the one which is suitable for the vane to be machined. This variation has, moreover, the advantage of being able to prepare the new vane to be machined before it is mounted on the machine tool and not keeping the latter inoperative for the whole time needed to position the vane on the stops of the machining head. The execution of this task, outside of the machine tool, facilitates moreover greatly the work of the operator which has all the space needed to install the vane 1. The risk of errors or imprecision during assembly are consequently greatly reduced.

In FIG. 10 the stationary part 22 of the lateral clamp 21 is formed as one piece with the shuttle tool 40 for the reasons of simplification of the design.

The procedure for installation of a turbine vane 1 in a machining head 5 according to the invention will now be described.

The operator positions the vane 1 with its outer side directed downwards for introduction into the machining head 5. The head is lowered, by moving it in the three directions in a suitable order, against the six points of the positioning reference system present on the stationary jaw 6 of said machining head: the two stops in the y direction of the leading edge (only Y'1 has been shown in FIG. 4), the stops X'1, X'2 and X'3 underneath the vane and finally the stop in the z direction, by pushing the vane 1 in the z direction until the platform 3 comes into contact against this stop.

The following operation consists in gripping the movable jaw 7 against the stationary jaw 6, while adjusting simultaneously the two gripping clamps 11 and 21. The operator lowers the vertical clamp 11 until the contact lugs 12 bear against the inner side of the vane 1 and checks that all the contact lugs properly fit against the surface of the inner side. Then the operator applies, using conventional means, a sufficient pressure on the clamp 11 to ensure retention of the vane despite the stresses which are produced by machining of the root 4. The operator repeats the same operation with the lateral clamp 21 pushing the base block 23 by means of the locking screw 24 until the protrusions 26 come into contact with the trailing edge of the vane 1. The operator then applies, in the same way as above, a calibrated pressure against the trailing edge of the vane by means of complementary screwing carried out on the locking screw 24. The tightening torque applied to this screw is that defined by the calculation, with the aim, on the one hand, of ensuring that the vane 1 is properly held and does not move during machining of the root and, on the other hand, that the pressure applied does not damage the trailing edge.

The results obtained have shown that, with a bearing surface for the four contact lugs 11 of at the most 250 mm$^2$, it was possible to hold the vane 1 with an applied pressure of less than 100 bar, and even of the order of 70 bar, without movements of this vane occurring during machining of the root 4. On account of the low pressures obtained it is possible to retain the inner side of the vane 1 by means of the contact lugs 11 without excessive scoring. Moreover, the presence of two bearing points on the trailing edge of the vane 1 ensures that there is no rotation of the vane in its center plane, despite the stresses due to machining of the root 4 which are considerable owing to the fact that the machining grinder moves in this plane, parallel to the direction extending from the trailing edge to the leading edge.

In order to prevent any pivoting or any tilting preferably the resultant of the forces applied acts, in the case of the contact lugs 11, inside the polygon linking together the stops X'1, X'2 and X'3 associated with the outer side and, in the case of the base block 23, inside the segment linking together the stops in the y direction (only Y'1 has been shown in FIG. 4) associated with the leading edge of the vane. It is also preferable, in order to equalize the pressure applied on each stop, that these resultants should act, respectively, in the region of the center of gravity of the positions of the stops considered.

Finally, preferably, taking into account the permissible tolerances for the manufacturing dimensions of the blade of the vanes 1, the clamping means 11 and 21 are not formed as a single piece, the surface of which would reproduce, in reverse, all or part of the surface of the blade, but contact is instead performed in point-like or small-area zones, which are distributed discretely over the surface of the blade 2. The clamps 11 and 21 are therefore better able to adapt to the variations observed with regard to the actual positioning of the surface of the blades.

The invention has been described with a mounting for locking the vane which leaves the root of the said vane free for machining thereof. It is quite clear that this mounting may be adapted to leave free and allow the machining of any part of the vane which is external to the blade, such as its top end or its platform.

What is claimed is:

1. A mounting for locking in a machine tool a vane of a turbine engine, the vane including a blade with a three-dimensional form having a non-planar surface delimited by a leading edge and a trailing edge; a platform; and a root adjacent to the blade, for machining of the root, the mounting comprising:
a stationary jaw configured to receive the vane and including, defined thereon, three points forming a first set of stops along a first direction oriented perpendicular with respect to a center plane of the blade, two points forming a second set of stops along a second direction parallel to a plane of the platform, and a third point forming a third stop along a third direction perpendicular to the first and second directions, the first and second sets of stops and the third stop defining a positioning reference system for the vane on the stationary jaw; and
a movable jaw configured to ensure, during machining of the root, retention of the vane against the stationary jaw,
wherein the movable jaw includes a first vertical clamp provided on a bottom surface of a carriage which moves vertically along a vertical track, the first vertical clamp exerts a pressure in a vertical direction, on the non-planar surface of the blade, such that bearing points on the non-planar surface of the blade abut the three points of the first set of stops,
wherein the stationary jaw includes a second lateral clamp which exerts a pressure in a lateral direction on one of the leading edge or the trailing edge, oriented substantially in the direction of the other of the leading edge or the trailing edge, such that the other of the leading edge or the trailing edge abuts the two points of the second set of stops,
wherein the second clamp includes a stationary part mounted on a first surface of the stationary jaw and a movable part which moves away from or towards the stationary part via a locking screw moving inside a cylindrical seat, the movable part including convex protrusions extending in a direction parallel to a moving direction of the movable part and distributed discretely along the one of the leading edge or the trailing edge,
wherein a stop is mounted on a second surface of the stationary jaw, the stop abutting the carriage at a lowermost position of the carriage,
wherein the stationary jaw includes a recess having a bottom which is substantially parallel to the center plane of the blade when the vane is retained between the stationary jaw and the movable jaw, the recess being provided below and between the second clamp and the stop, and
wherein the first clamp comprises at least three bearing points distributed discretely on the non-planar surface.

2. The locking mounting as claimed in claim 1, wherein the first clamp comprises at least three bearing points distributed discretely on the non-planar surface.

3. The locking mounting as claimed in claim 1, wherein the first clamp comprises at least four bearing points distributed discretely over the non-planar surface so that the pressure exerted on the surface is, at all points, less than 100 bar.

4. The locking mounting as claimed in claim 2, wherein a resultant of forces acting on the non-planar surface acts inside a polygon linking together the points of the first set of stops associated with the surface.

5. The locking mounting as claimed in claim 4, wherein a resultant of forces acting on the non-planar surface acts substantially in a region of center of gravity of the points of the first set of stops associated with the surface, each of the points of the first set of stops being acted on by a same coefficient of friction.

6. The locking mounting as claimed in claim 1, wherein the second clamp comprises at least two bearing points distributed discretely along the one of the leading edge or the trailing edge.

7. The locking mounting as claimed in claim 6, wherein a resultant of forces acting on the one of the leading edge or trailing edge acts inside a segment linking together the two points of the second set of stops associated with the other of the leading edge or the trailing edge.

8. The locking mounting as claimed in claim 7, wherein the resultant of the forces acting on the one of the leading edge or the trailing edge acts substantially in a region of center of gravity of the two points of the second set of stops associated with the other of the leading edge or the trailing edge, each of the two points of the second set of stops being acted on by a same coefficient of friction.

9. The locking mounting as claimed in claim 6, wherein the second clamp has a form of a base block with protrusions.

10. The locking mounting as claimed in claim 1, comprising a workpiece retained against the stationary jaw by the movable jaw.

11. The locking mounting as claimed in claim 1, wherein the second clamp includes a stationary part mounted on the stationary jaw and a movable part which moves away from or towards the stationary part via a locking screw moving inside a cylindrical seat, the movable part including convex protrusions extending in a direction parallel to a moving direction of the movable part.

12. The locking mounting as claimed in claim 1, wherein the points of the first, second, and third sets of stops all extend vertically.

13. The locking mounting as claimed in claim 1, wherein the stationary jaw includes a recess having a bottom which is substantially parallel to the center plane of the blade when the vane is retained between the stationary jaw and the movable jaw.

* * * * *

UNITED STATES PATENT AND TRADEMARK OFFICE
CERTIFICATE OF CORRECTION

PATENT NO. : 10,112,275 B2
APPLICATION NO. : 13/582205
DATED : October 30, 2018
INVENTOR(S) : Olivier Dupouy et al.

It is certified that error appears in the above-identified patent and that said Letters Patent is hereby corrected as shown below:

In the Specification

Column 5, Line 7, change "stops X', X'2 and X'3" to --stops X'1, X'2 and X'3--;

Column 5, Line 59, change "stops and clamps" to --stops X', Y' and Z' and clamps--.

Signed and Sealed this
Fifth Day of May, 2020

Andrei Iancu
*Director of the United States Patent and Trademark Office*